United States Patent Office 2,979,497
Patented Apr. 11, 1961

2,979,497

CYCLIC ALUMINUM OXIDE ACYLATES, ALKOXIDES, AND PHENOXIDES

Jacobus Rinse, Bernardsville, N.J., assignor to J. W. Ayers & Co., Easton, Pa., a corporation of Delaware No Drawing. Filed Feb. 12, 1957, Ser. No. 639,638

10 Claims. (Cl. 260—97.5)

This invention relates to new compounds definable as cyclic aluminum oxide polymers and to methods of producing the same. The compounds are exemplified by triacylated cyclic aluminum oxide trimers.

Processes for producing linear polymers of the acylate derivatives of aluminum alkoxides have been described in the literature. It has now been discovered that such processes produce non-homogeneous products or reaction masses containing a substantial percentage, e.g. 20–25% of ester side-products as an impurity. The presence of these impurities imparts undesirable properties and restricts the possible fields of use.

An object of the invention is to produce a new series of aluminum acylates and alkoxide polymers having solubility and reaction properties superior to those of the known related aluminum compounds. Another object is to produce such aluminum compositions in pure form or substantially free of ester side products.

Yet another object is to provide an improved and simpler method of producing polymeric aluminum oxide acylates and alkoxides.

The compounds of the invention may be defined broadly as cyclic aluminum oxide polymers having an acyloxy, an alkoxy or a phenoxy group attached to each aluminum atom. The class of compounds possessing properties making them appear as the most important at the present time are triacylated cyclic aluminum oxide trimers of the apparent formula:

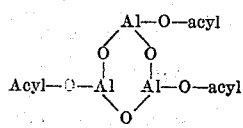

In accordance with the process of the invention for producing this more important class of compounds, aluminum alkoxides are reacted with monocarboxylic acids and water in the molar ratio of approximately 1:1:1 respectively, until 3 mols of alcohol have been liberated, the alcohol being distilled off to produce the triacylated cyclic aluminum oxide trimer. Some deviation in the stated molar ratio is permissible without affecting the desirable properties of the polymer to any substantial degree. Variations as high as 10% are generally permissible and in others only as high as 5%. Any excess of water and acid tends to reduce the solubility of the product, and leads to the production of more viscous products. On the other hand, the use of excess aluminum alkoxide leads to greater sensitivity of the final product to moisture.

The aluminum alkoxides used in the practice of the process of the invention are preferably derived from lower molecular alcohols or alcohols of sufficiently low volatility that when they are liberated in the process by the reaction of the acid and water molecules with the aluminum molecules, they may be easily removed by distillation. Suitable low-volatile alcohols are propanol, butanol, and amyl alcohol and the corresponding iso alcohols and secondary alcohols. High molecular alcohols, however, can be employed under some conditions, the higher alcohols having up to 10 carbon atoms being utilized without too much difficulty. In actual practice isopropanol has advantages of low cost and low boiling point. Aluminum alkoxides of mixed alcohols can be employed to meet special problems.

The monobasic carboxylic acids suitable for the process of the invention may be of any type including aliphatic, either saturated or unsaturated, aromatic, cycloaliphatic, and heterocyclic acids, and as well ester acids (half esters of dicarboxylic acids) and various substituted acids such as hydroxy acids and amino acids. The preferred class is fatty acids, from formic acid up through the long chain fatty acids as stearic acid and oleic acid. Other operable acids include behenic acid and the various acids or mixture of acids from tall oil or other industrial or natural sources. Instead of a single acid, mixtures of two or more acids can be employed.

The instant invention includes cyclic alkoxy aluminum acylate polymers which may be defined by the formula:

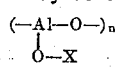

wherein X, in at least one instance, is a hydrocarbon radical, and in the remaining instances, is an acyl radical.

These polymers with the mixed substituents can be perpared, in accordance with the present invention, by reacting the aluminum alkoxide, acid and water in the approximate molar ratio of 3:2:3. The resulting trimer will then be an alkoxy aluminum oxide diacylate. If the molar proportion of the acid is between 2 and 3 then mixtures of the said compounds with the triacylates will be obtained.

For the production of the cyclic aluminum alcoholate trimers, an alcohol is substituted for the acid in the process hereinbefore described. The alcohol should be of higher molecular weight than the alcohol from which the aluminum alkoxide used has been produced. In producing the compounds, the preferred procedure is to mix the alcohol and water in a common solvent and then introduce the same into the aluminum alkoxide in liquid form. When cyclic polymeric aluminum alcoholates of higher alcohols, e.g. stearyl and oleyl alcohols, are to be produced the higher alcohol can be introduced first into the liquid aluminum alkoxide and then the water added very slowly, the water preferably being in a mutual solvent, for thereby the formation of lumps is avoided.

In the foregoing process, phenol may be substituted for the alcohol, and cyclic aluminum phenolate polymers will be produced. Mixtures of alcohols and phenols can be employed to produce products of special properties. Not only may phenol itself be used, but also phenolic compounds like cresol and other alkylated phenols and also phenols having non-functional substituents or substituents not active in the reaction being carried out.

The cyclic polymers obtained when the alcoholate or phenolate is produced may be designated by the following formula:

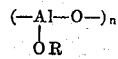

wherein R is a hydrocarbon radical.

More in detail, the process of the present invention involves the introduction of the monocarboxylic acid (or the alcohol or the phenol) and the water, preferably in solution in a common solvent, into the aluminum alkoxide previously brought into the liquid form either by heating or being dissolved in a solvent, the ratio of the reactants being as hereinbefore described. The aluminum alkoxide is preferably maintained at a temperature at which the reaction proceeds, for example at 80°–120° C., during the addition. Such addition is preferably effected slowly, during constant agitation of the aluminum alkoxide. As the reaction proceeds alcohol corresponding to the alkoxide radical or radicals is liberated. It is preferably removed as the reaction proceeds, but it can be retained temporarily in the reaction mass by refluxing. When all the reactants have combined with the liberation of alcohol is substantially complete, the temperature may be raised to distill off the liberated alcohol and solvents employed. A vacuum, for example, up to 1 or 2 inches is finally applied with advantage and the temperature may be increased to a level of about 180° C. or up to any level below the decomposition level. The polymeric product obtained is substantially free of ester side products, generally below 2% and always below 10%, apparently.

When the acid component used is a lower fatty acid or equivalent acid, lower reaction temperatures can be used than those given above, and under some circumstances, lower temperatures are required. When the carboxylic acid used is soluble in water in the molar ratio of 1:1, no common solvent is ordinarily required. However, such solvents may be used in any instance required, to prevent the reaction mass from becoming so viscous as to interfere with the success or ease of operation of the process.

As common solvents for the acid and water there may be mentioned various hydrocarbons, such as xylene, hexane and toluene; also alcohols, ketones and other non-reactive solvents. Since the solvent is ordinarily removed upon completion of the process, it preferably should have a boiling point between about 80° and 140° C. For some contemplated uses, the solvent may not be objectionable if left in the polymer product.

Where the solvent is to be distilled off, it is advantageous to use an alcohol, for it can be the same alcohol as that liberated from the aluminum alkoxide used. When the alcohols used are the same, the distillate finally obtained may then be employed as such for preparing fresh aluminum alkoxide.

In a specific embodiment of the invention, a dicarboxylic acid anhydride is employed in place of the monocarboxylic acid. When phthalic or maleic anhydride, for example, is to be reacted, it may be used without first converting it to its half ester. This property arises from the fact that the anhydrides form an addition product with the aluminum alkoxide which polymerizes by the addition of water upon liberation of the alkoxide group in the form of alcohol.

*Example 1*

A solution of 290 gm. tall oil fatty acids and 18 gm. water in 80 gm. isopropanol and 80 gm. xylene is slowly added to a solution of 204 gm. aluminum isopropoxide in 100 gm. toluene at 90° C. A reflux condenser is used during the addition and the temperature is held at 90°–110° C. When all acid has been added, the condenser is removed and isopropanol is distilled off with toluene until 140° C. is reached. Then vacuum is applied and the temperature raised to 180° C. The resulting product is a clear, viscous oil. Yield 335 gm.

*Example 2*

Instead of 290 gm. tall oil fatty acids, 280 gm. stearic acid is used and the acid-water solution is heated to 50° C. The reflux condenser is omitted. The resulting product is a clear, wax-like material (yield 326 gm.) solidifying on cooling and melting at 40°–50° C. It is readily soluble in mineral oil.

*Example 3*

Following the procedure of Example 1, 144 gm. of ethylhexoic acid is used as the acid component, and 190 gm. of a solid resinous material soluble in xylene is obtained.

*Example 4*

One hundred and nine gm. aluminum di-isopropoxy, sec. butanol is dissolved in 90 gm. xylene and heated to 100° C. Then a clear solution of 58 gm. caproic acid and 9 gm. water in 40 gm. methylethylketone is added slowly. Isopropanol and ketone distill off during the reaction. Finally, the temperature is raised to 170° C. and vacuum is applied. A solid non-meltable white product is obtained which is soluble in xylene. The yield is 80 gm.

*Example 5*

To a solution of 51 gm. aluminum isopropoxide in 50 gm. xylene at 120° C., there is added slowly a solution of 75 gm. hydroxy stearic acid and 4.5 gm. water in 80 gm. isopropanol and 90 gm. xylene. Vacuum is applied and the temperature kept at 120° C. until a wax-like product is obtained. Yield 90 gm.

*Example 6*

To a solution of 109 gm. aluminum di-isopropoxy sec. butoxide in 200 gm. of xylene at 120° C. there is added slowly a melted mixture of 46.7 gm. stearic acid, 40.6 gm. benzoic acid and 9 gm. water. Vacuum is applied and the temperature raised to 170° C. The yield is 116 gm. of a solid wax-like material which dissolves clearly in mineral oil.

*Example 7*

One hundred and four gm. aluminum isopropoxide and 132 gm. sec. amylalcohol are heated at 150°–160° C. until 90 gm. isopropanol is removed. Then 74 gm. phthalic anhydride is dissolved in 80 gm. xylene and mixed with a solution of 9 gm. water in 50 gm. methylethylketone. This mixed solution is added slowly to the aluminum amyloxide solution at 100° C. Then the temperature is raised to 140° C. and vacuum is applied, yielding finally 130 gm. of a light yellow colored resin, soluble in toluene.

*Example 8*

To 104 gm. aluminum isopropoxide in 120 gm. toluene at 90° C. there is added under reflux a solution of 166.5 gm. behenic acid and 9 gm. water in 120 gm. isopropanol with 40 gm. xylene at 60° C. The reflux condenser is removed and all solvents are distilled off under vacuum, finally at 200° C. A viscous clear liquid is obtained. Yield 192 gm.

*Example 9*

To a solution of 122.4 gm. aluminum isopropoxide in 100 gm. xylene heated at 90°–100° C. there is added a solution of 159 gm. technical oleyl alcohol in 10.8 gm. water, 100 gm. isopropanol and 100 gm. xylene. The solvents are distilled off and the temperature is raised to 150° C. whereupon vacuum is finally applied. A viscous oil is obtained (185 gm.) consisting mainly of trimer oxo aluminum trioleylate.

*Example 10*

To a solution of 102 gm. aluminum isopropoxide in 50 gm. xylene heated at 100° C. there is added a solution of 50 gm. cyclohexanol with 9 gm. water in 50 gm. toluene and 50 gm. water. The batch is treated as in Example 9 and it gradually becomes solid. Then 50 gm. xylene is added which dissolves the resinous polymer, and as a result 122 gm. of a clear solution is obtained composed of trimer oxo aluminum cyclohexanolate.

*Example 11*

To 68 gm. aluminum isopropoxide dissolved in 100 gm. xylene heated at 100° C. there is added a solution of 100 gm. of a rosin alcohol (Abitol) and 6 gm. water dissolved in 100 gm. xylene and 100 gm. isopropanol. The solvents are removed by distillation until 200° C. is finally reached. A viscous clear resin is obtained (120 gm.) composed of trimer oxo aluminum abitolate.

Example 12

To a solution of 40.8 gm. aluminum isopropoxide in 40 gm. xylene at 100° C. there is added a solution of 33 gm. amylphenol and 3.6 gm. water in 40 gm. xylene and 40 gm. isopropanol. The solvents are removed by distillation until 150° C. is reached, finally under vacuum. The product is very viscous and dissolves easily in xylene. Yield 45 gm.

Example 13

To a solution of 204 gm. aluminum isopropoxide in 100 gm. xylene at 100° C. there is added a solution of 183 gm. linseed fatty acids, 18 gm. water in 100 gm. isopropanol and 100 gm. xylene under reflux. The mixture is then heated to 150° C. under vacuum, finally of 2 inches. Yield 25.1 gm. of a viscous oil is obtained.

It will be obvious that instead of only one higher alcohol, or phenol, or monocarboxylic acid, also mixtures of these compounds may be used, which will result in cyclic trimers with different groups on one, two or three of the aluminum atoms of the ring.

The cyclic aluminum oxide polymers of the present invention possess several outstanding properties. An unexpected feature is their low melting point and easy solubility in organic solvents in comparison with the aluminum polymers heretofore known. The cyclic polymers are relatively stable, and on prolonged contact with water, organic acids, alcohols, polyalcohols or derivatives thereof containing free hydroxy or carboxy groups, they react by addition. If such active hydrogen compounds are mixed in excess and left with the polymers over a prolonged period, the latter will finally decompose completely into monomeric aluminum derivatives containing one or two hydroxyl groups per aluminum atom.

The polymers of the invention containing higher molecular substituents are either meltable or are liquids at room temperature, e.g. the laurate, oleate, palmitate, stearate, and the behenate. Polymers containing lower molecular acylate radicals, e.g. the formate, acetate, and benzoate, are non-meltable solids which can be dissolved in various solvents including aromatic hydrocarbons. The polymers containing low molecular acylate radicals are more reactive than those produced from higher molecular acids, e.g. oleic and linoleic acids. All of the polymers are acid acceptors, those produced from low molecular acids having the greatest capacity in this respect.

The cyclic aluminum polymers can be employed with substantial advantage in various industrial applications.

A. They may be employed as gelling agents for alkyd resins and for drying oils, yielding strongly thixotropic vehicles for paints.

B. They may be employed as thickening agents for glyceride oils and fats by heating the mixtures for several hours at 250° C. The glyceride oils may be either saturated or unsaturated. Apparently the glyceride and the aluminum polymers combine by transfer of acyloxy groups.

C. They may be used as thickening agents for mineral oils, asphalts, paraffins, polyethylene and other hydrocarbons, as by reacting the cyclic polyaluminum sterate or oleate or other long chain acylate with a short chain or aromatic acid, preferably benzoic acid whose aluminum salt is not, or is only sparingly soluble in the hydrocarbon. Such mixed aluminum salts can raise the dropping points of oils, asphalt, etc. to temperatures above 250° C. The resulting products are very stable and do not separate, probably because of the molecular dispersion of the aluminum soap. They do not need controlled cooling.

D. They may be used as water-proofing agents for textiles, paper and other cellulose derivatives.

E. The polyaluminum oxide phthalates and maleates are hard resins, soluble in styrene and many other monomers, and may be used in coating compositions. The unsaturated polymers of the invention will copolymerize with styrene and other like monomers, and provide polyester-like plastics having high melting points and rapid surface drying characteristics.

F. The phthalate resins are compatible with nitrocellulose and when applied as coatings they yield hard, tough, and water-resistant films.

It should be understood that the present invention is not limited to the specific compounds, procedures or reaction conditions herein described but that it extends to all equivalents which will occur to those skilled in the art upon consideration of the general teachings herein and the scope of the claims appended hereto.

I claim:

1. A process for the production of cyclic aluminum oxide polymers which comprises reacting an aluminum alkoxide the alkyl group of which contains up to 10 carbon atoms with a compound selected from the group consisting of unsubstituted monocarboxylic acids of 1–22 carbon atoms and unsubstituted dicarboxylic acid anhydrides and with water, in the molar ratio of approximately 3:2–3:3 respectively, by heating to a final temperature above 80° C. at which and until 8–9 mols of alcohol, respectively, per 3 mols of aluminum compound used are liberated.

2. A process for the production of cyclic aluminum oxide polymers which comprises, reacting an aluminum alkoxide the alkyl group of which contains up to 10 carbon atoms with an unsubstituted monocarboxylic acid of 1–22 carbon atoms and water in a molar ratio of approximately 1:1:1 respectively by heating to a final temperature above 80° C. at which and until three mols of alcohol per mol of aluminum compound used are liberated, and distilling off said alcohol to produce a triacylated cyclic aluminum oxide trimer.

3. A process for the production of cyclic aluminum oxide polymers which comprises, introducing an unsubstituted monocarboxylic acid of 1–22 carbon atoms and water both in solution form into an aluminum alkoxide the alkyl group of which contains up to 10 carbon atoms in hot liquid form in an approximate molar ratio of 2–3:3:3 while heating to a final temperature above 80° C. which liberates 8–9 mols of alcohol per mol of aluminum compounds used and which vaporizes the alcohol liberated, continuing the heating until the reaction is complete and the liberated alcohol and the solvent have been distilled off.

4. A process for the production of cyclic aluminum oxide polymers which comprises, gradually adding a solution of an unsubstituted monocarboxylic acid of 1–22 carbon atoms and water in a mutual solvent to an aluminum alkoxide the alkyl group of which contains up to 10 carbon atoms in liquid form in an approximate molar ratio of 1:1:1, while the reaction mass is heated to a final temperature above 80° C. which liberates 3 mols of alcohol per mol of aluminum compound used and which distills off liberated alcohol as the reaction proceeds, and continuing the heating until the reaction is complete and three mols of alcohol and the solvent have been distilled off.

5. A process for the production of cyclic aluminum oxide polymers which comprises reacting one mol of an unsubstituted dicarboxylic anhydride with one mol of an aluminum alkoxide the alkyl group of which contains up to 10 carbon atoms and with one mol of water by heating to a final temperature above 80° C. at which 3 mols of alcohol per mol of aluminum compound used are liberated, and continuing the heating until the liberation of alcohol ceases, the alcohol being removed by distillation.

6. A process for the production of acyloxy aluminum oxides which comprises reacting an aluminum alkoxide the alkyl group of which contains up to 10 carbon atoms with an unsubstituted monocarboxylic acid of 1-22 carbon atoms and water in a molar ratio of approximately 1:1:1 respectively by heating the reaction mass first at a temperature below about 120° C. until liberation of alcohol ceases and then to a final temperature above about 140° C. at which additional alcohol is formed, this heating being continued until liberation of alcohol ceases.

7. A process for the production of acyloxy aluminum oxides which comprises reacting an aluminum alkoxide the alkyl group of which contains up to 10 carbon atoms with an unsubstituted monocarboxylic acid of 1-22 carbon atoms and water in a molar ratio of approximately 1:1:1 respectively by heating the reaction mass first at a temperature below about 120° C. until liberation of alcohol ceases, vaporizing off the free alcohol present and as well any solvent employed, then heating to a final temperature above about 140° C. at which additional alcohol is formed and continuing the heating until the total alcohol liberated amounts to 3 mols per mol of the aluminum compound used.

8. A process for the production of acyloxy aluminum oxides which comprises introducing an unsubstituted monocarboxylic acid of 1-22 carbon atoms and water into an aluminum alkoxide the alkyl group of which contains up to 10 carbon atoms in liquid condition, the molar ratio of acid, water and alkoxide used being approximately 1:1:1, the reacting mass during the introduction being agitated and maintained at a temperature between about 80° and 120° C., continuing said heating until liberation of alcohol substantially ceases, then heating to a final temperature above about 140° C. at which additional alcohol is formed, continuing the heating at this higher temperature until the total alcohol liberated amounts to 3 mols per mol of the aluminum compound used, and vaporizing off the alcohol present and as well any solvent employed.

9. A process for the production of triacylated aluminum oxide trimers which comprises reacting an aluminum alkoxide of an alcohol of up to 10 carbon atoms with an aliphatic hydrocarbon monocarboxylic acid of 1-18 carbon atoms and with water in a molar ratio of approximately 1:1:1, respectively, by heating to a final temperature above 80° C. at which and until three mols of alcohol per mol of aluminum compound used are liberated and distilled off.

10. A process for the production of triacylated aluminum oxide trimers which comprises gradually adding an aliphatic hydrocarbon monocarboxylic acid of 1-18 carbon atoms and water in a mutual solvent to an aluminum alkoxide of an alcohol of up to 10 carbon atoms in liquid form in an approximate molar ratio of 1:1:1 while the reaction mass is maintained at a temperature above 80° C. at which reaction is caused with liberation of alcohol, continuing the heating and reaction until three mols of alcohol per mol of aluminum compound used have been distilled off.

References Cited in the file of this patent

UNITED STATES PATENTS

| | | |
|---|---|---|
| 2,744,074 | Theobald | May 1, 1956 |
| 2,751,284 | Hill et al. | June 19, 1956 |

FOREIGN PATENTS

| | | |
|---|---|---|
| 569,946 | Germany | Mar. 25, 1931 |

OTHER REFERENCES

Gray et al.: J. Physical and Colloid Chem., vol. 53, pp. 23–39 (1949).

Parry et al.: Trans. Faraday Soc., vol. 46, April 1950, pp. 305–10.

Mehkotra: J. Indian Chem. Soc., vol. 31, No. 2, pp. 85–90 (1954).